(12) United States Patent
Preisler

(10) Patent No.: US 11,518,136 B2
(45) Date of Patent: *Dec. 6, 2022

(54) MARINE DECKING WITH SANDWICH-TYPE CONSTRUCTION AND METHOD OF MAKING SAME

(71) Applicant: Global IP Holdings, LLC, Sterling Heights, MI (US)

(72) Inventor: Darius J. Preisler, Macomb, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 566 days.

This patent is subject to a terminal disclaimer.

(21) Appl. No.: 15/615,025

(22) Filed: Jun. 6, 2017

(65) Prior Publication Data

US 2017/0266912 A1    Sep. 21, 2017

Related U.S. Application Data

(63) Continuation-in-part of application No. 13/479,974, filed on May 24, 2012, now abandoned, and a
(Continued)

(51) Int. Cl.
*B32B 3/26* (2006.01)
*B29C 43/02* (2006.01)
(Continued)

(52) U.S. Cl.
CPC .............. *B32B 3/26* (2013.01); *B29C 43/021* (2013.01); *B29C 43/203* (2013.01); *B32B 3/12* (2013.01);
(Continued)

(58) Field of Classification Search
None
See application file for complete search history.

(56) References Cited

U.S. PATENT DOCUMENTS 2,763,314 A    9/1956  Gill
2,988,809 A    6/1961  Hall
(Continued)

FOREIGN PATENT DOCUMENTS

DE    202011005339 U1    7/2012
FR         2635399 A1    2/1990
(Continued)

OTHER PUBLICATIONS

Bitzer, T; Honeycomb Technology, Springer-Science+Business Media, B.V., (1997), pp. 17-20. (Year: 1997).*

(Continued)

*Primary Examiner* — Elizabeth Collister
(74) *Attorney, Agent, or Firm* — Brooks Kushman P.C.

(57) ABSTRACT

A marine deck member and the process for forming the same. The marine deck member comprises a sandwich-type composite panel made by a compression molding process. In such a process, the panel is made by subjecting a heated stack of layers of material to cold-pressing in a mold. The cellular core has a 2-D array of cells, with end faces open to the respective layers or skins. The surface traction of this type of composite panel can be enhanced for marine deck applications by controlled debossing, or embossing, of the first skin while it cools in the compression mold. The debossing effect can be affected by applying pressurized gas, e.g., pressurized air, onto the outer surface of the first skin while in the compression mold. The embossing can be affected by applying vacuum pressure on the outer surface of the first skin while in the compression mold.

1 Claim, 7 Drawing Sheets

Related U.S. Application Data continuation-in-part of application No. 13/762,879, filed on Feb. 8, 2013, now Pat. No. 9,873,488.

(51) Int. Cl.

| | | |
|---|---|---|
| *B29C 43/20* | (2006.01) | |
| *B63B 3/48* | (2006.01) | |
| *B32B 3/12* | (2006.01) | |
| *F16B 5/01* | (2006.01) | |
| *B63B 5/24* | (2006.01) | |
| *B63B 1/12* | (2006.01) | |
| *B63B 73/46* | (2020.01) | |
| *B63B 3/09* | (2006.01) | |
| *B63B 3/20* | (2006.01) | |
| *B63B 3/68* | (2006.01) | |

(52) U.S. Cl.
CPC .............. *B32B 3/266* (2013.01); *B63B 1/121* (2013.01); *B63B 3/48* (2013.01); *B63B 5/24* (2013.01); *B63B 73/46* (2020.01); *B32B 2250/40* (2013.01); *B32B 2260/023* (2013.01); *B32B 2260/046* (2013.01); *B32B 2605/00* (2013.01); *B63B 3/09* (2013.01); *B63B 3/20* (2013.01); *B63B 3/68* (2013.01); *F16B 5/01* (2013.01); *Y10T 428/24008* (2015.01)

(56) References Cited

U.S. PATENT DOCUMENTS

| | | |
|---|---|---|
| 3,355,850 A | 12/1967 | Rohe |
| 3,512,328 A | 5/1970 | Eriksson |
| 3,514,798 A | 6/1970 | Ellis |
| 3,543,315 A | 12/1970 | Hoffman |
| 3,568,254 A | 3/1971 | Stolki |
| 3,651,563 A | 3/1972 | Volkmann |
| 3,750,525 A | 8/1973 | Waters et al. |
| 3,789,728 A | 2/1974 | Shackelford |
| 3,814,653 A | 6/1974 | Heier |
| 3,955,266 A | 5/1976 | Honami et al. |
| 4,175,995 A | 11/1979 | Walter |
| 4,204,822 A | 5/1980 | Hewitt |
| 4,529,639 A | 7/1985 | Peoples et al. |
| 4,550,854 A | 11/1985 | Schellenberg |
| 4,576,776 A | 3/1986 | Anderson |
| 4,717,612 A | 1/1988 | Shackelford |
| 4,721,641 A | 1/1988 | Bailey |
| 4,737,390 A | 4/1988 | Fricano et al. |
| 4,835,030 A | 5/1989 | Squier et al. |
| 4,836,380 A | 6/1989 | Walter et al. |
| 4,846,612 A | 7/1989 | Worthing |
| 4,941,785 A | 7/1990 | Witten |
| 5,022,943 A | 6/1991 | Zaima |
| 5,026,445 A | 6/1991 | Mainolfi et al. |
| 5,037,498 A | 8/1991 | Umeda |
| 5,074,726 A | 12/1991 | Betchei et al. |
| 5,076,870 A | 12/1991 | Sanborn |
| 5,143,778 A | 9/1992 | Shuert |
| 5,198,175 A | 3/1993 | Kato et al. |
| 5,217,563 A | 6/1993 | Nielbling et al. |
| 5,253,962 A | 10/1993 | Close, Jr. |
| 5,266,374 A | 11/1993 | Ogata |
| 5,269,660 A | 12/1993 | Rice |
| 5,294,223 A | 3/1994 | Phillips |
| 5,298,694 A | 3/1994 | Thompson et al. |
| 5,316,604 A | 5/1994 | Fell |
| 5,370,521 A | 12/1994 | Mcdougall |
| 5,417,179 A | 5/1995 | Niemier et al. |
| 5,423,933 A | 6/1995 | Horian |
| 5,433,151 A | 7/1995 | Ohara |
| 5,474,008 A | 12/1995 | Vespoli et al. |
| 5,502,930 A | 4/1996 | Burkette et al. |
| 5,514,017 A | 5/1996 | Chimiak |
| 5,534,097 A | 7/1996 | Fasano et al. |
| 5,683,782 A | 11/1997 | Duchene |
| 5,700,050 A | 12/1997 | Gonas |
| 5,744,210 A | 4/1998 | Hofmann et al. |
| 5,750,160 A | 5/1998 | Weber et al. |
| 5,888,610 A | 3/1999 | Fournier |
| 5,911,360 A | 6/1999 | Schellenberg |
| 5,915,445 A | 6/1999 | Rauenbusch |
| 5,925,304 A | 7/1999 | Kudoh |
| 5,928,735 A | 7/1999 | Padmanabhan et al. |
| 5,979,962 A | 11/1999 | Balentin et al. |
| 6,030,490 A | 2/2000 | Francisco et al. |
| 6,050,630 A | 4/2000 | Hochet |
| 6,066,217 A | 5/2000 | Dibbie et al. |
| 6,102,464 A | 8/2000 | Schneider et al. |
| 6,102,630 A | 8/2000 | Schneider et al. |
| 6,280,551 B1 | 8/2001 | Hilligoss |
| 6,435,577 B1 | 8/2002 | Renault |
| 6,537,413 B1 | 3/2003 | Hochet et al. |
| 6,546,694 B2 | 4/2003 | Clifford |
| 6,615,762 B1 | 9/2003 | Scott |
| 6,631,785 B2 | 10/2003 | Khambete et al. |
| 6,648,554 B1 | 11/2003 | Sehl |
| 6,655,299 B2 | 12/2003 | Preisler et al. |
| 6,659,223 B2 | 12/2003 | Allison et al. |
| 6,682,675 B1 | 1/2004 | Vandangeot et al. |
| 6,682,676 B1 | 1/2004 | Renault et al. |
| 6,748,876 B2 | 6/2004 | Preisler et al. |
| 6,752,443 B1 | 6/2004 | Thompson et al. |
| 6,790,026 B2 | 9/2004 | Vandangeot et al. |
| 6,793,747 B2 | 9/2004 | North et al. |
| 6,823,803 B2 | 11/2004 | Preisler |
| 6,825,803 B2 | 11/2004 | Wixforth et al. |
| 6,843,525 B2 | 1/2005 | Preisler |
| 6,862,863 B2 | 3/2005 | Mccorkle et al. |
| 6,890,023 B2 | 5/2005 | Preisler et al. |
| 6,905,155 B1 | 6/2005 | Preisler et al. |
| 6,926,348 B2 | 8/2005 | Krueger et al. |
| 6,945,594 B1 | 9/2005 | Bejin et al. |
| 6,981,863 B2 | 1/2006 | Renault et al. |
| 7,014,259 B2 | 3/2006 | Heholt |
| 7,059,646 B1 | 6/2006 | Delong et al. |
| 7,059,815 B2 | 6/2006 | Ando et al. |
| 7,090,274 B1 | 8/2006 | Khan et al. |
| 7,093,879 B2 | 8/2006 | Putt et al. |
| 7,121,128 B2 | 10/2006 | Kato et al. |
| 7,188,881 B1 | 3/2007 | Sturt et al. |
| 7,204,056 B2 | 4/2007 | Sieverding |
| 7,207,616 B2 | 4/2007 | Sturt |
| 7,222,915 B2 | 5/2007 | Phiippot et al. |
| 7,264,685 B2 | 9/2007 | Katz et al. |
| 7,316,788 B2 | 1/2008 | Autrey et al. |
| 7,320,739 B2 | 1/2008 | Thompson, Jr. et al. |
| 7,393,036 B2 | 7/2008 | Bastian et al. |
| 7,402,537 B1 | 7/2008 | Lenda et al. |
| 7,419,713 B2 | 9/2008 | Wilkens et al. |
| 7,530,322 B2 | 5/2009 | Angelini |
| 7,628,440 B2 | 12/2009 | Berhardsson et al. |
| 7,713,011 B2 | 5/2010 | Orszagh et al. |
| 7,837,009 B2 | 11/2010 | Gross et al. |
| 7,854,211 B2 | 12/2010 | Rixford |
| 7,909,379 B2 | 3/2011 | Winget et al. |
| 7,918,313 B2 | 4/2011 | Gross et al. |
| 7,919,031 B2 | 4/2011 | Winget et al. |
| 7,942,475 B2 | 5/2011 | Murray et al. |
| 7,963,243 B2 | 6/2011 | Quigley |
| 8,052,237 B2 | 11/2011 | Althammer et al. |
| 8,062,762 B2 | 11/2011 | Stalter |
| 8,069,809 B2 | 12/2011 | Wagenknecht et al. |
| 8,117,972 B2 | 2/2012 | Winget et al. |
| 8,133,419 B2 | 3/2012 | Burks et al. |
| 8,226,339 B2 | 7/2012 | Neri |
| 8,262,968 B2 | 9/2012 | Smith et al. |
| 8,298,675 B2 | 11/2012 | Allessandro et al. |
| 8,475,884 B2 | 7/2013 | Kia |
| 8,622,456 B2 | 1/2014 | Preisler et al. |
| 8,651,549 B2 | 2/2014 | Raffel et al. |
| 8,690,233 B2 | 4/2014 | Preisler et al. |
| 8,764,089 B2 | 7/2014 | Preisler et al. |
| 8,795,465 B2 | 8/2014 | Preisler et al. |

(56) References Cited

U.S. PATENT DOCUMENTS

| | | |
|---|---|---|
| 8,795,807 B2 | 8/2014 | Preisler |
| 8,808,827 B2 | 8/2014 | Preisler et al. |
| 8,808,828 B2 | 8/2014 | Preisler et al. |
| 8,808,829 B2 | 8/2014 | Preisler et al. |
| 8,808,830 B2 | 8/2014 | Preisler et al. |
| 8,808,831 B2 | 8/2014 | Preisler et al. |
| 8,808,833 B2 | 8/2014 | Preisler |
| 8,808,834 B2 | 8/2014 | Preisler et al. |
| 8,808,835 B2 | 8/2014 | Preisler et al. |
| 8,852,711 B2 | 8/2014 | Preisler et al. |
| 8,859,074 B2 | 8/2014 | Preisler et al. |
| 8,883,285 B2 | 8/2014 | Preisler et al. |
| 8,834,985 B2 | 9/2014 | Preisler et al. |
| 9,302,315 B2 | 4/2016 | Verbeek et al. |
| 9,364,975 B2 | 6/2016 | Preisler et al. |
| 2002/0096804 A1 | 7/2002 | Gupte |
| 2003/0106741 A1 | 6/2003 | Tompson et al. |
| 2003/0197400 A1 | 10/2003 | Preisler et al. |
| 2004/0078929 A1 | 4/2004 | Schoemann |
| 2004/0151566 A1 | 8/2004 | Nick |
| 2005/0189674 A1 | 9/2005 | Hochet et al. |
| 2005/0233106 A1 | 10/2005 | Imamura et al. |
| 2006/0121244 A1 | 6/2006 | Godwin et al. |
| 2006/0137294 A1 | 6/2006 | Waits |
| 2006/0185866 A1 | 8/2006 | Jung et al. |
| 2006/0008609 A1 | 10/2006 | Snyder et al. |
| 2006/0255611 A1 | 11/2006 | Smith et al. |
| 2006/0291974 A1 | 12/2006 | McGee |
| 2007/0065264 A1 | 3/2007 | Sturt et al. |
| 2007/0069542 A1 | 3/2007 | Steiger et al. |
| 2007/0082172 A1 | 4/2007 | Derbyshire et al. |
| 2007/0218787 A1 | 9/2007 | Carter |
| 2007/0256379 A1 | 11/2007 | Edwards |
| 2007/0258786 A1 | 11/2007 | Orszagh et al. |
| 2008/0086965 A1* | 4/2008 | Metz ............... E04C 2/365 52/309.4 |
| 2008/0185866 A1 | 5/2008 | Jeong et al. |
| 2008/0169678 A1 | 7/2008 | Ishida et al. |
| 2008/0193256 A1 | 8/2008 | Neri |
| 2009/0108639 A1 | 4/2009 | Sturt et al. |
| 2010/0026031 A1 | 2/2010 | Jouraku |
| 2010/0038168 A1 | 2/2010 | Mandos et al. |
| 2010/0086728 A1 | 4/2010 | Theurl et al. |
| 2010/0170746 A1 | 7/2010 | Restuccia et al. |
| 2010/0206467 A1 | 8/2010 | Durand et al. |
| 2010/0255251 A1 | 10/2010 | Le Roy |
| 2011/0045720 A1 | 2/2011 | Conner, Jr. |
| 2011/0260359 A1 | 10/2011 | Durand et al. |
| 2011/0315310 A1 | 12/2011 | Trevisan et al. |
| 2012/0247654 A1 | 10/2012 | Piccin et al. |
| 2012/0315429 A1 | 12/2012 | Stamp et al. |
| 2013/0031752 A1 | 2/2013 | Davies |
| 2013/0075955 A1 | 3/2013 | Piccin et al. |
| 2013/0137798 A1 | 5/2013 | Piccin |
| 2013/0233228 A1 | 9/2013 | Bartlett |
| 2013/0278002 A1 | 10/2013 | Preisler et al. |
| 2013/0278003 A1 | 10/2013 | Preisler et al. |
| 2013/0278007 A1 | 10/2013 | Preisler et al. |
| 2013/0278008 A1 | 10/2013 | Preisler et al. |
| 2013/0278009 A1 | 10/2013 | Preisler et al. |
| 2013/0278015 A1 | 10/2013 | Preisler et al. |
| 2013/0278018 A1 | 10/2013 | Preisler et al. |
| 2013/0278019 A1 | 10/2013 | Preisler et al. |
| 2013/0278020 A1 | 10/2013 | Preisler et al. |
| 2013/0280459 A1 | 10/2013 | Nakashima et al. |
| 2013/0280469 A1 | 10/2013 | Preisler et al. |
| 2013/0280472 A1 | 10/2013 | Preisler et al. |
| 2013/0280473 A1 | 10/2013 | Preisler et al. |
| 2013/0280475 A1 | 10/2013 | Champion |
| 2013/0312652 A1 | 11/2013 | Preisler et al. |
| 2013/0316123 A1 | 11/2013 | Preisler et al. |
| 2013/0333837 A1 | 12/2013 | Preisler et al. |
| 2013/0341971 A1 | 12/2013 | Masini et al. |
| 2014/0013691 A1* | 1/2014 | Brewster ............... B32B 27/365 52/309.13 |
| 2014/0077518 A1 | 3/2014 | Preisler et al. |
| 2014/0077530 A1 | 3/2014 | Preisler et al. |
| 2014/0077531 A1 | 3/2014 | Preisler et al. |
| 2014/0145465 A1 | 5/2014 | Preisler et al. |
| 2014/0145470 A1 | 5/2014 | Preisler et al. |
| 2014/0147617 A1 | 5/2014 | Preisler et al. |
| 2014/0147622 A1 | 5/2014 | Preisler et al. |
| 2014/0154461 A1 | 6/2014 | Preisler et al. |
| 2014/0225296 A1 | 8/2014 | Preisler et al. |
| 2014/0233228 A1 | 8/2014 | Komiyama et al. |
| 2014/0335303 A1 | 11/2014 | Preisler et al. |
| 2015/0130105 A1 | 5/2015 | Preisler et al. |
| 2015/0130220 A1 | 5/2015 | Preisler et al. |
| 2015/0130221 A1 | 5/2015 | Preisler et al. |
| 2015/0130222 A1 | 5/2015 | Preisler et al. |
| 2015/0132532 A1 | 5/2015 | Preisler et al. |
| 2016/0059446 A1 | 3/2016 | Lofgren |
| 2017/0266911 A1 | 9/2017 | Preisler |
| 2017/0266912 A1 | 9/2017 | Preisler |

FOREIGN PATENT DOCUMENTS

| | | |
|---|---|---|
| JP | H07137183 A | 5/1995 |
| JP | H07308983 A | 11/1995 |

OTHER PUBLICATIONS

United States Patent and Trademark Office, Non-Final Office Action for U.S. Appl. No. 15/615,028, dated Jun. 19, 2018.

Office Action; related to U.S. Appl. No. 15/615,028; dated Oct. 18, 2017.

United States Patent and Trademark Office, Non-Final Office Action for U.S. Appl. No. 15/615,028 dated Mar. 14, 2019.

Non-Final Office Action, related U.S. Appl. No. 13/479,974; dated Feb. 13, 2015.

Notice of Allowance and Fee(s) Due; related U.S. Appl. No. 13/603,552; dated Feb. 18, 2015.

Office Action; related U.S. Appl. No. 13/479,974; dated Oct. 15, 2014.

Office Action; related U.S. Appl. No. 13/479,974; dated Mar. 20, 2014.

Office Action; related U.S. Appl. No. 13/686,362; dated Mar. 25, 2014.

Office Action; related U.S. Appl. No. 13/523,253; dated Mar. 25, 2014.

Office Action; related U.S. Appl. No. 13/688,972; dated Mar. 28, 2014.

Office Action; related U.S. Appl. No. 13/687,232; dated Mar. 28, 2014.

Office Action; related U.S. Appl. No. 13/689,809; dated Mar. 31, 2014.

Office Action; related U.S. Appl. No. 13/687,213; dated Mar. 31, 2014.

Office Action; related U.S. Appl. No. 13/690,265; dated Mar. 31, 2014.

Office Action; related U.S. Appl. No. 13/762,904; dated Apr. 8, 2014.

Office Action; related U.S. Appl. No. 13/762,800; dated Apr. 8, 2014.

Office Action; related U.S. Appl. No. 13/762,861; dated Apr. 9, 2014.

Office Action; related U.S. Appl. No. 13/690,566; dated Apr. 9, 2014.

Office Action; related U.S. Appl. No. 13/762,832; dated Apr. 11, 2014.

Office Action; related U.S. Appl. No. 13/762,921; dated Apr. 14, 2014.

Notice of Allowance; related U.S. Appl. No. 13/686,388; dated Apr. 15, 2014.

Office Action; related U.S. Appl. No. 13/453,201 (now U.S. Pat. No. 8,690,233); dated Nov. 20, 2013.

Office Action; related U.S. Appl. No. 13/523,209 (now U.S. Pat. No. 8,622,456) dated Apr. 29, 2013.

(56) References Cited

OTHER PUBLICATIONS

Decision on Appeal for U.S. Appl. No. 13/762,956 mailed Apr. 24, 2017. (7 pages).
Notice of Allowance and Fee(s) Due; related U.S. Appl. No. 14/087,563, dated Mar. 3, 2016.
Office Action, related U.S. Appl. No. 14/603,403; notification dated Sep. 14, 2016.
Office Action, related U.S. Appl. No. 14/603,404; dated Aug. 25, 2016.
Notice of Allowance and Fee(s) Due; related U.S. Appl. No. 14/603,397; dated Oct. 17, 2016.
Office Action, related U.S. Appl. No. 14/603,407, dated Oct. 4, 2016.
Notice of Allowance and Fee(s) Due; related U.S. Appl. No. 14/603,404; dated Dec. 2, 2016.
Final Office Action; related U.S. Appl. No. 14/603,403; dated Dec. 7, 2016.
Non-Final Office Action; related U.S. Appl. No. 15/337,013; dated Dec. 27, 2016.
Notice of Allowance and Fee(s) Due; related U.S. Appl. No. 14/603,418; dated Dec. 28, 2016.
Corrected Notice of Allowability; related U.S. Appl. No. 14/603,401; dated Jun. 23, 2016.
Office Action; related U.S. Appl. No. 14/603,418; dated Jun. 16, 2016.
Notice of Allowance and Fee(s) Due; related U.S. Appl. No. 14/444,164; dated Jul. 15, 2016.
Office Action; related U.S. Appl. No. 14/603,397; dated Jul. 21, 2016.
Office Action; related U.S. Appl. No. 14/087,563; dated Jul. 20, 2015.
Office Action; related U.S. Appl. No. 13/762,879; dated Jul. 31, 2015.
Notice of Allowance and Fee(s) Due; related U.S. Appl. No. 14/087,579; dated Aug. 3, 2015.
Office Action, U.S. Appl. No. 14/603,413; dated Apr. 23, 2015.
Notice of Allowance and Fee(s) Due related U.S. Appl. No. 14/087,591; dated Mar. 12, 2015.
Non-Final Office Action, related U.S. Appl. No. 13/762,879; dated Feb. 13, 2015.
Notice of Allowance and Fee(s) Due; related U.S. Appl. No. 14/603,403; dated Jan. 29, 2016.
Office Action; related U.S. Appl. No. 13/762,956; dated Apr. 17, 2015.
Non-Final Office Action dated Mar. 28, 2018 for U.S. Appl. No. 15/615,028.
Final Rejection for corresponding U.S. Appl. No. 15/615,028, dated Oct. 2, 2018, 27 Pages.
United States Patent and Trademark Office, Non-Final Office Action U.S. Appl. No. 15/615,019, dated Mar. 24, 2021.
AbstractDE102005039837A1, 1 page, Jan. 2007.
United States Patent and Trademark Office, Non-Final Office Action for U.S. Appl. No. 16/698,786 dated Jul. 21, 2022.

* cited by examiner

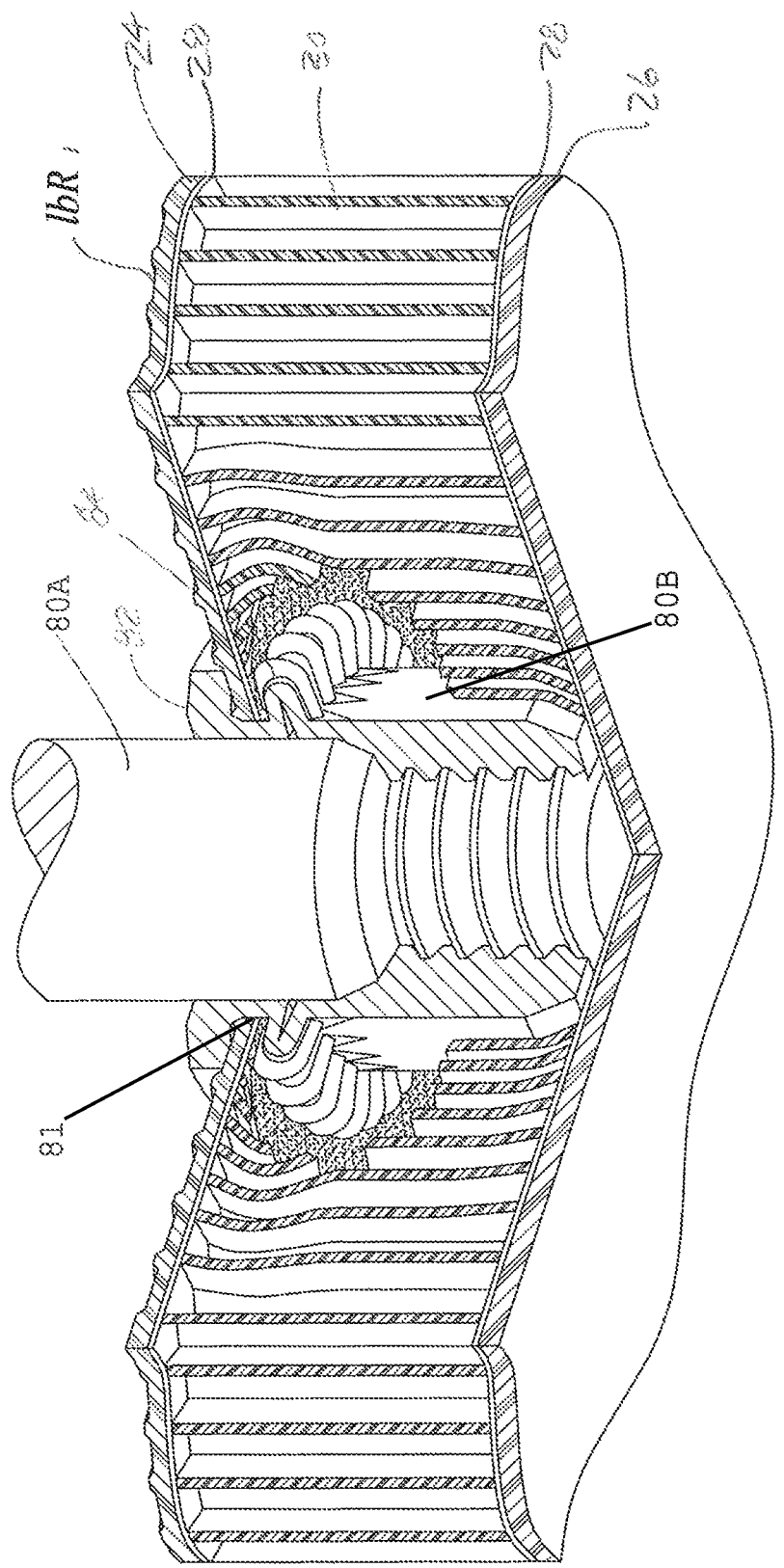

MARINE DECKING WITH SANDWICH-TYPE CONSTRUCTION AND METHOD OF MAKING SAME

CROSS-REFERENCE TO RELATED APPLICATIONS

This application is a continuation-in-part of U.S. application Ser. No. 13/479,974, filed May 24, 2012, and U.S. Ser. No. 13/762,879, filed Feb. 8, 2013 the disclosures of which are hereby incorporated in their entirety by reference herein. This application is also related to U.S. Ser. No. 14/603,418, filed Jan. 23, 2015 (now U.S. Pat. No. 9,567,037, issued Feb. 14, 2017); and Ser. No. 13/517,877, filed Jan. 14, 2012 (Abandoned).

TECHNICAL FIELD

This invention relates to marine decking for use with pontoon boats, docks, rafts, swim platforms, watercraft docking stations and the like, and methods for making the same.

BACKGROUND

The surfaces of boat decks, swim platforms, docks and similar marine structures are commonly made of fiberglass, aluminum, treated plywood, vinyl or perforated rubber. These surfaces are subjected to sun light/heat, rain, humidity, etc. in harsh marine service environments. These materials can deteriorate and require repair or replacement over extended periods of use.

Another factor is these materials can be slippery. Prior efforts to provide non-slip marine surfaces are found in U.S. Pat. No. 4,737,390, for Non-Slip Coating for Molded Articles, and Pub. No. US 2013/0233228, for Porous Anti-Slip Floor Covering. In U.S. Pat. No. 4,737,390 a layer of latex or latex-impregnated sheet material is adhered to molded thermoset plastic article while curing in the mold. FIG. 4 illustrates the application of this sheet material in a boat deck. In Pub. No. US 2013/0233228 a porous anti-slip floor covering uses a layer of curled strands placed on an underlayment.

Factors affecting the suitability of a material for marine deck applications, in addition to the ability to withstand the environmental factors above, include cost, weight, strength, traction and buoyancy.

SUMMARY

The marine deck materials of the present invention utilize sandwich-type, compression-molded, composite components. Sandwich-type composite panels including cores have very important characteristics because of their light weight and high strength. Such panels are constructed by sandwiching a cellular core having low strength characteristics between two outer plastic layers or skins, each of which is much thinner than the core but has excellent mechanical characteristics. The core is made of a 2-D array of cells, each of the cells having an axis substantially perpendicular to the outer surfaces, and extending in the space between the layers or skins, with end faces open to the respective layers or skins.

Sandwich-type composite panels are conventionally made by a compression molding process. In such a process, the panel is made by subjecting a heated stack of layers of material to cold-pressing in a mold. The stack is made up of, at least: a first skin of plastic material, a cellular core, and a second skin also of plastic material. The stack may be pre-heated outside the mold or heated inside the mold to a softening temperature. Once the stack is placed in the mold, the closing of the mold halves causes the inner surfaces of the softened skins to bond to the mating faces of the core.

In one embodiment, the sandwich-type composite panel has a first skin of thermoplastic material, a second skin of thermoplastic material, and a cellular core of thermoplastic material positioned between the skins. The skins are bonded to the core by press molding. The cellular core has a 2-D array of cells, each of the cells having an axis substantially perpendicular to the outer surfaces, and extending in the space between the layers or skins, with end faces open to the respective layers or skins.

In another embodiment, the sandwich-type composite panel has a first skin of a fiber-reinforced thermoplastic material, a first sheet of thermoplastic adhesive, a second skin of fiber-reinforced thermoplastic material, a second sheet of thermoplastic adhesive and a cellular core of a cellulose-based material positioned between the skins. The skins are bonded to the core by the first and second adhesive sheets and by press molding. The cellular core has a 2-D array of cells, each of the cells having an axis substantially perpendicular to the outer surfaces, and extending in the space between the layers or skins, with end faces open to the respective layers or skins.

The surface traction of this type of composite panel can be enhanced for marine deck applications by controlled (i) debossing, or (ii) embossing, of the first, outer skin while it cools in the compression mold. The air in the core cavities causes thermal gradients relative to the cell walls that result in uneven cooling over the surface area of the skin. The resultant uneven cooling is manifested as "debossing" (or, "sink marks") on the surfaces of the skins. The phenomenon of debossing can be used advantageously to enhance surface traction of the outer surface of the first skin.

The debossing effect can be accentuated by applying pressurized gas, e.g., pressurized nitrogen or air, onto the outer surface of the first skin as it cools in the compression mold.

Alternatively, the uneven cooling phenomenon can be used to "emboss" the surface of the skin be application of vacuum pressure while the skin is cooling in the mold. The embossments are raised surfaces that also enhance surface traction on the outer surface of the first skin.

The debossing/embossing pattern on the outer surface can be defined by the cross-sectional shape of the cells. Cells of circular cross-sectional will produce circular debossments/embossments; cells of honeycomb shape will produce hexagonal debossments/embossments; and cells of cleated shape will produce cleat-shaped debossments/embossments.

The invention provides marine deck materials that have a relatively high strength-to-weight ratio, buoyancy, and enhanced surface traction. These properties make these deck materials suited for use in such applications as boat decks, swim platforms, docks and similar marine structures.

BRIEF DESCRIPTION OF THE DRAWINGS

FIG. 12 is a cross-sectional view, partially broken away, of a marine deck member of the present invention having a fastener component mounted within.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
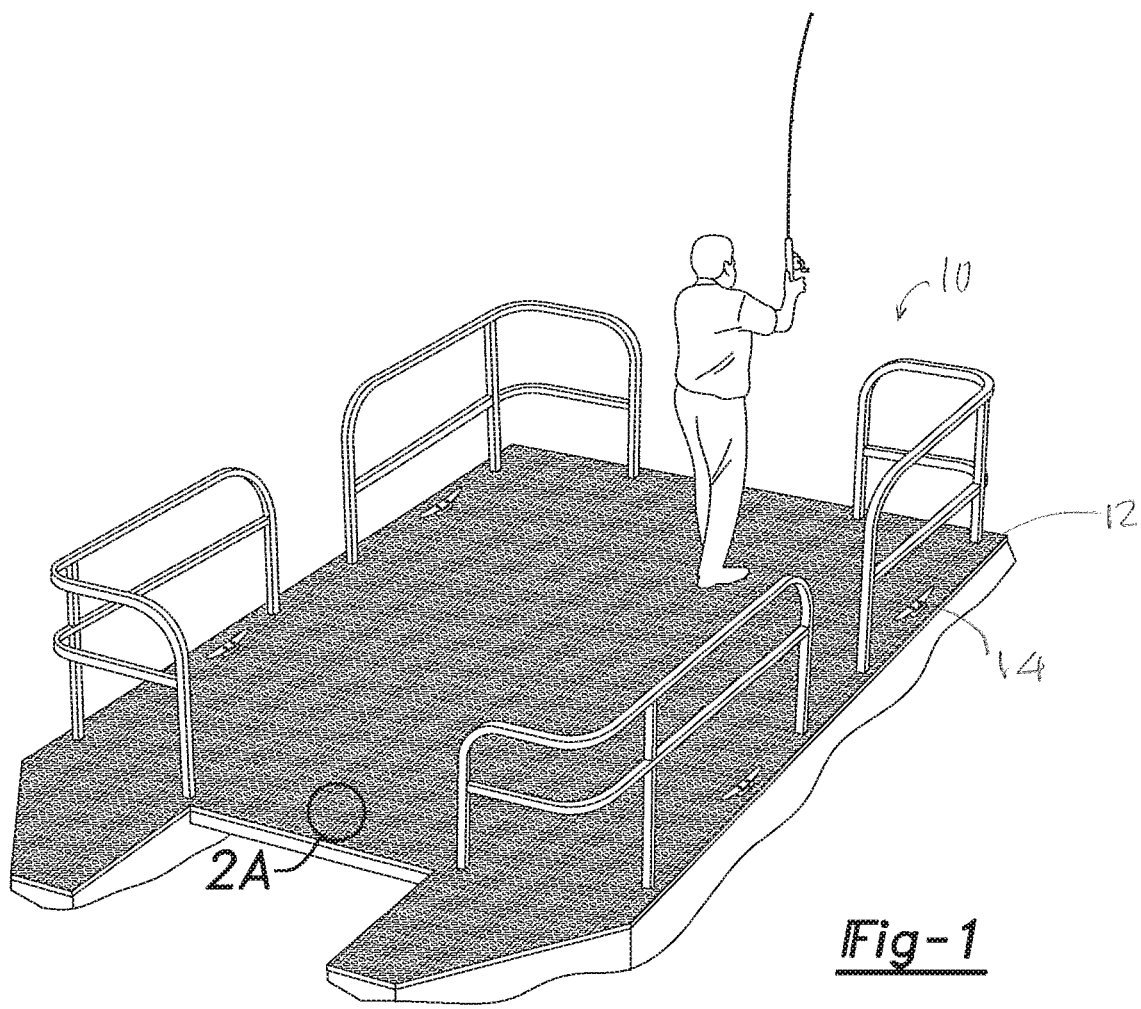
FIG. 1 is a perspective view of a pontoon deck as a representative product application of the present invention.

FIG. 1 shows a pontoon boat 10 as a representative application of the present invention. The deck 12 can be composed of modular panels or tiles fitted to the surface configuration of the pontoon boat. The deck 12 has mounted on it conventional surface cleats 14 to facilitate docking. In addition to pontoon boat decks, the present invention is also suited for other marine applications where enhanced surface traction is desired, for example, docks, diving boards, swim platforms, watercraft docking stations and the like.

Figure 2A:
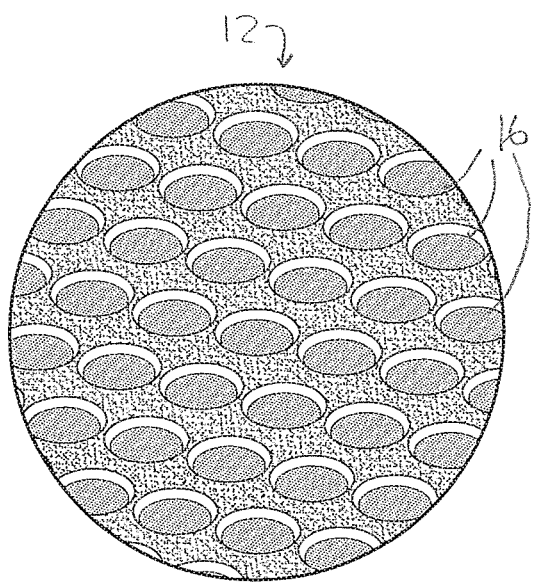
FIG. 2A is an enlarged view of the pontoon deck surface, encircled as "2A" in FIG. 1, showing debossments matching the cross-sectional shape of the circular cells in the core.

FIG. 2A is a close-up view of the encircled portion of the pontoon deck 12 of FIG. 1. The deck surface has a pattern of debossments, formed with the assistance of pressurized gas in the process of compression molding the marine deck. The shape of the debossment 16 corresponds to the cross-sectional shape of the cell in the cellular core used in the composite molding.

Figure 2B:
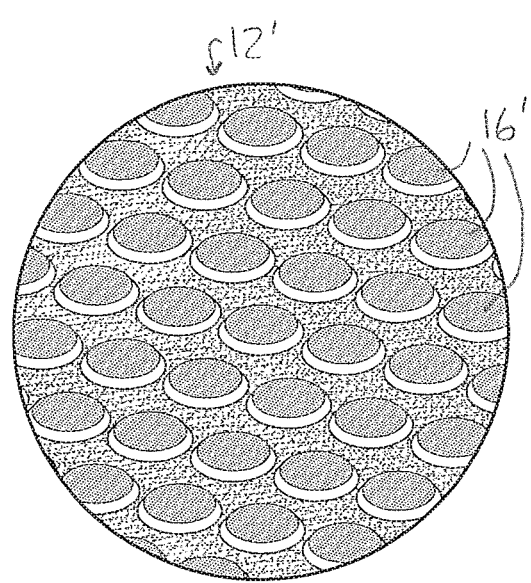
FIG. 2B is an enlarged view of a pontoon deck surface showing embossments matching the cross-sectional shape of the circular cells in the core.

FIG. 2B is a close-up view of an alternative embodiment of a pontoon deck surface 12' showing embossments 16' matching the cross-sectional shape of the circular cells in the core. The embossments 16' are formed with the assistance of vacuum pressure in the process of compression molding the marine deck.

Figure 3:
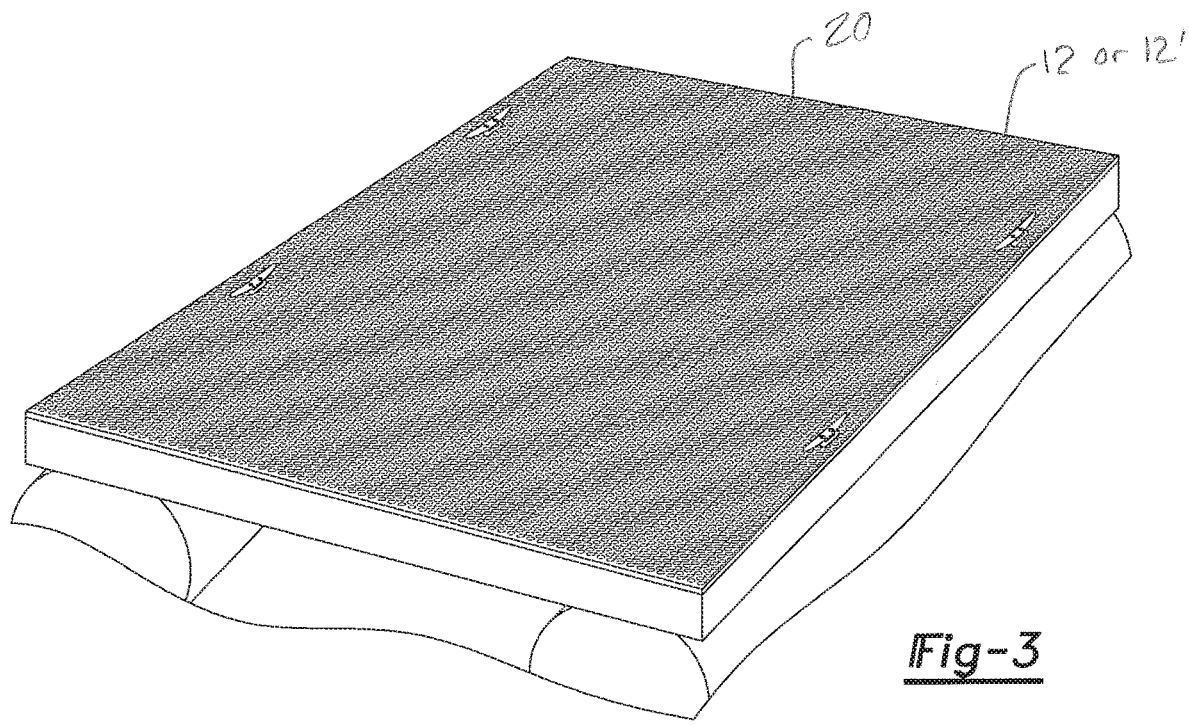
FIG. 3 is a perspective view of a swim platform or diving raft as another representative product application of the present invention.

FIG. 3 shows the marine deck surfaces of the present invention applied with a swim platform (or diving raft) 20. The deck 12 or 12' can be formed with debossments or embossments, respectively, as discussed below.

Figure 4:
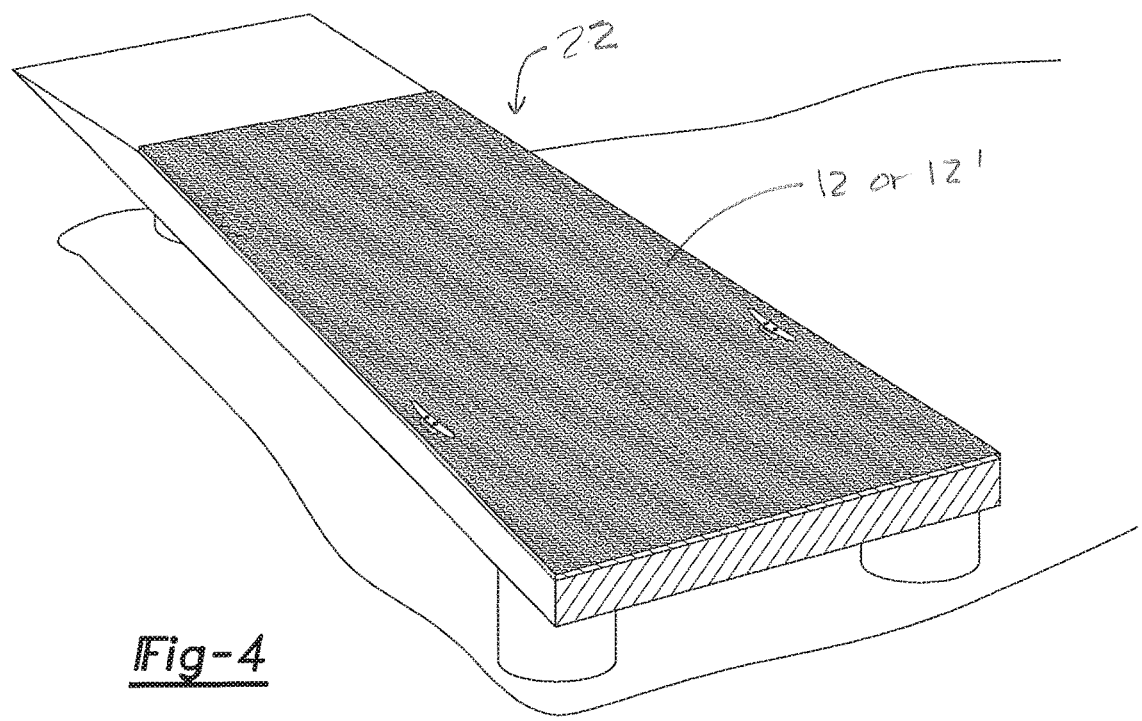
FIG. 4 is a perspective view of a dock as another representative product application of the present invention.

FIG. 4 shows the marine deck surfaces of the present invention applied with to the deck surface of a dock 22. Again, the deck 12 or 12' can be formed with debossments or embossments, respectively, as discussed below.

Figure 5A:
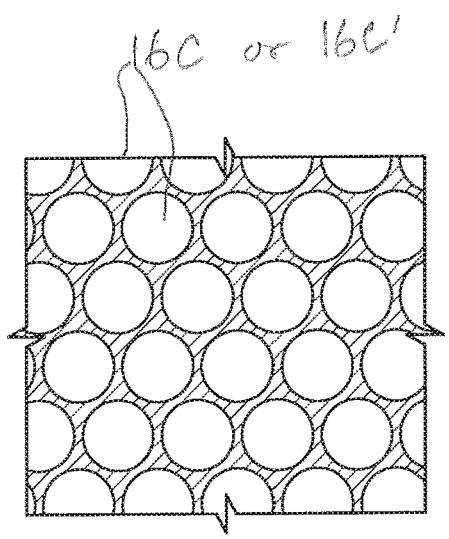
FIGS. 5A-C are top plan schematic views, partially broken away, of different configurations, e.g., honeycomb-like, of cellular cores.
Figure 5B:
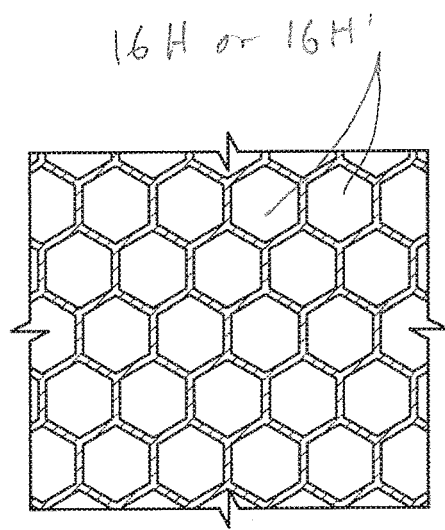
Figure 5C:
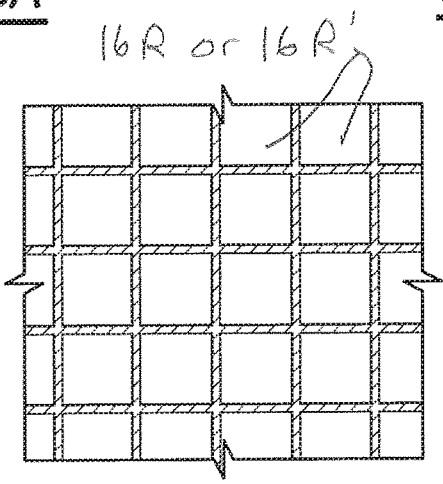

FIGS. 5A-5C show exemplary surface shapes for the debossments and embossments to be formed in the marine deck surface, whether a watercraft deck, swim platform, dock, or other application. FIG. 5A shows circular shapes for debossments 16C, or circular embossments 16C'. FIG. 5B shows honeycomb shapes for debossments 16H, or honeycomb embossments 16H'. FIG. 5C shows rectangular shapes for debossments 16R, or rectangular embossments 16R'. The surface shape of the debossments or embossments will correspond to the cross-sectional shape of the cells in the core of the sandwich-type structure.

Figure 6:
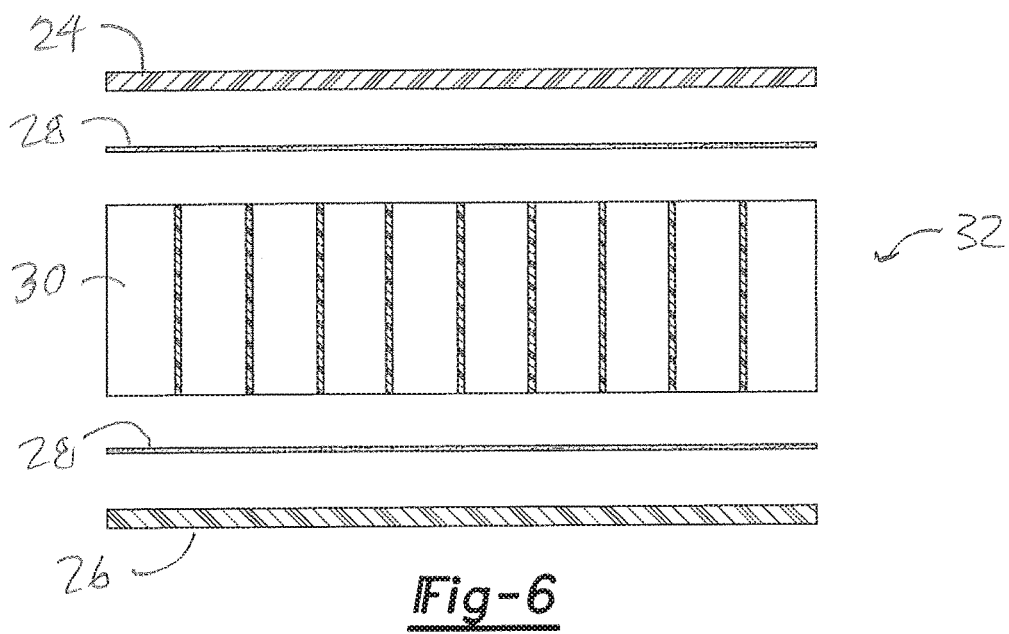
FIG. 6 is an exploded, side sectional view showing a sandwich-type composite panel with a first skin of a fiber-reinforced thermoplastic material, a first sheet of thermoplastic adhesive, a second skin of fiber-reinforced thermoplastic material, a second sheet of thermoplastic adhesive and a cellular core of a cellulose-based material positioned between the skins.

FIG. 6 is an exploded side view of the constituent parts of the composite panel 32 preparatory to compression molding. As shown in FIG. 6, a stack includes first and second reinforced thermoplastic skins or outer layers 24 and 26, respectively, a plastic core 30 having a large number of cells disposed between and bonded to plies or films or sheets of hot-melt adhesive (i.e. thermoplastic adhesive) 28 which, in turn, are disposed between and bonded to the skins 24 and 26 by compression molding. The sheets 28 may be bonded to their respective skins 24 and 26 prior to the press molding or are preferably bonded during the press molding. The thermoplastic of the sheets 28 is typically compatible with the thermoplastic of the skins 24 and 26 so that a strong bond is formed therebetween. One or more other plastics may also be included within the adhesive of the sheets 28 to optimize the resulting adhesive 24 and 26 and their respective sheets or film layers 28 (with the core 30 layers 28) are heated typically outside of a mold (i.e. in an oven) to a softening temperature wherein the hot-melt adhesive becomes sticky or tacky. The mold is preferably a low-pressure, compression mold which performs a thermo-compression process on the stack of materials.

The sticky or tacky hot-melt adhesive 28 extends a small amount into the open cells during the thermo-compression process. The skins 24 and 26 are bonded to the top and bottom surfaces of the core 30 by the sheets 28 to seal the cells of the core 30 to the facing surfaces of the skins 24 and 26.

The step of applying the pressure compacts and reduces the thickness of the cellular core 30 and top and bottom surface portions of the cellular core penetrate and extend into the film layers 28 without penetrating into and possibly encountering any fibers located at the outer surfaces of the skins 24 and 26 thereby weakening the resulting bond.

Each of the skins 24 and 26 may be fiber reinforced. The thermoplastic of the sheets or film layers 28, and the skins 24 and 26 may be polypropylene. Alternatively, the thermoplastic may be polycarbonate, polyimide, acrylonitrile-butadiene-styrene as well as polyethylene, polyethylene terphthalate, polybutylene terphthalate, thermoplastic polyurethanes, polyacetal, polyphenyl sulphide, cyclo-olefin copolymers, thermotropic polyesters and blends thereof. At least one of the skins 24 or 26 may be woven skin, such as polypropylene skin. Each of the skins 24 and 26 may be reinforced with fibers, e.g., glass fibers, carbon fibers, aramid and/or natural fibers. At least one of the skins 24 and 26 can advantageously be made up of woven glass fiber fabric and of a thermoplastics material.

The cellular core 30 of the FIG. 6 embodiment may be a cellulose-based honeycomb core. In this example, the cellular core has an open-celled structure of the type made up of a tubular honeycomb. The axes of the cells are oriented transversely to the skins 24 and 26.

Figure 8:
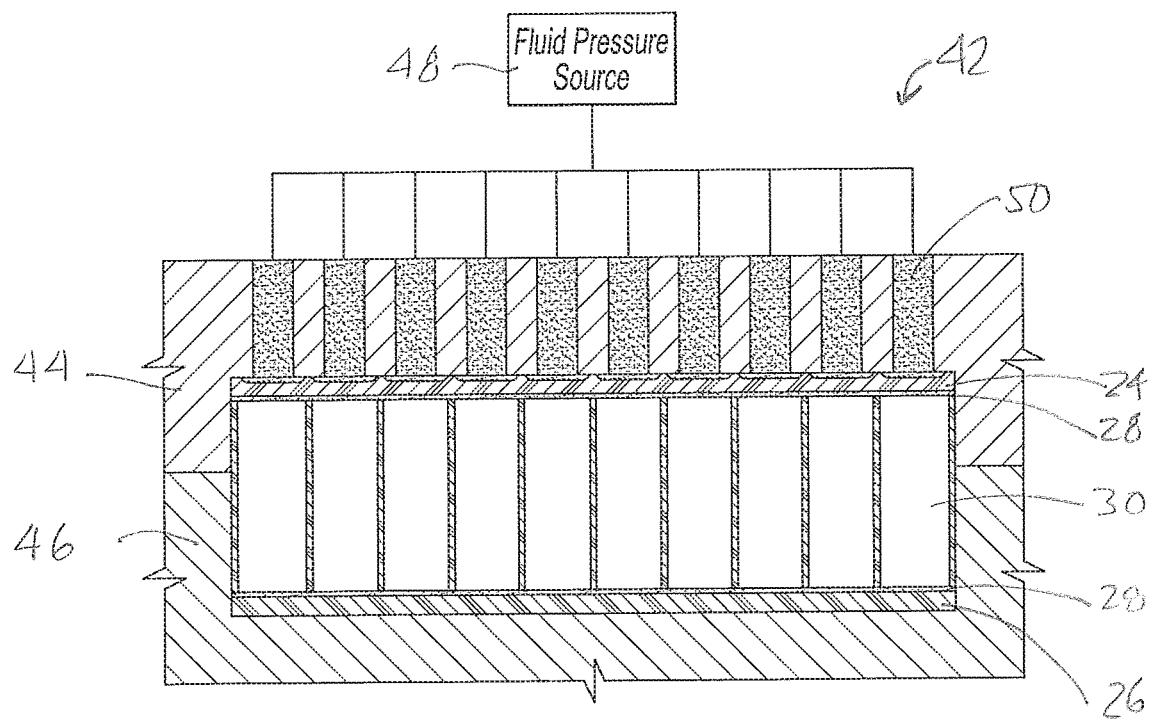
FIG. 8 is a schematic, side sectional view showing a fluid pressure-assisted compression mold useful in facilitating debossing of the of the upper surface of the molded composite component to enhance its surface traction.

The stack of material may be pressed in a low pressure, cold-forming mold 42 shown schematically in cross-section in FIG. 8. The mold has halves 44 and 46, which when closed have an internal cavity for the stack. The stack is made up of the first skin 24, the adhesive layers 28, the cellulose-based cellular core 30, and the second skin 26, and is pressed at a pressure lying in the range of 10×105 Pa. to 30×105 Pa. The first and second skins 24 and 26, and the first and second film layers 28 are preferably pre-heated to make them malleable and stretchable. Advantageously, in order to soften the first and second skins 24 and 26, and their respective film layers 28, heat is applied to a pre-assembly made up of at least the first skin 24, the first and second film layers 28, the cellular core 30, and the second film layer 26 so that, while the composite panel 32 is being formed in the mold, the first and second skins 24 and 26 and the film layers 28 have a forming temperature lying approximately in the range of 160° C. to 200° C., and, in this example, about 180° C.

Air in the sealed cavities urges softened portions of the sheets 24 and 26 and portions of the core 30 inwardly towards the cavities of the core 30.

The mold 42 is formed with a pattern of fluid passageways 50, aligned with the cell openings, to permit the application of fluid pressure onto the surface of the first skin 24 from a fluid pressure source 48. The applied fluid pressure augments the tendency of the sheets to deboss in the area above the cells. The pressure level and duration can be selected to determine the depth of the debossments 16 formed in the outer surface of the first skin 24. The debossments 16 enhance the surface traction of the outer surface of the skin 24.

Figure 9:
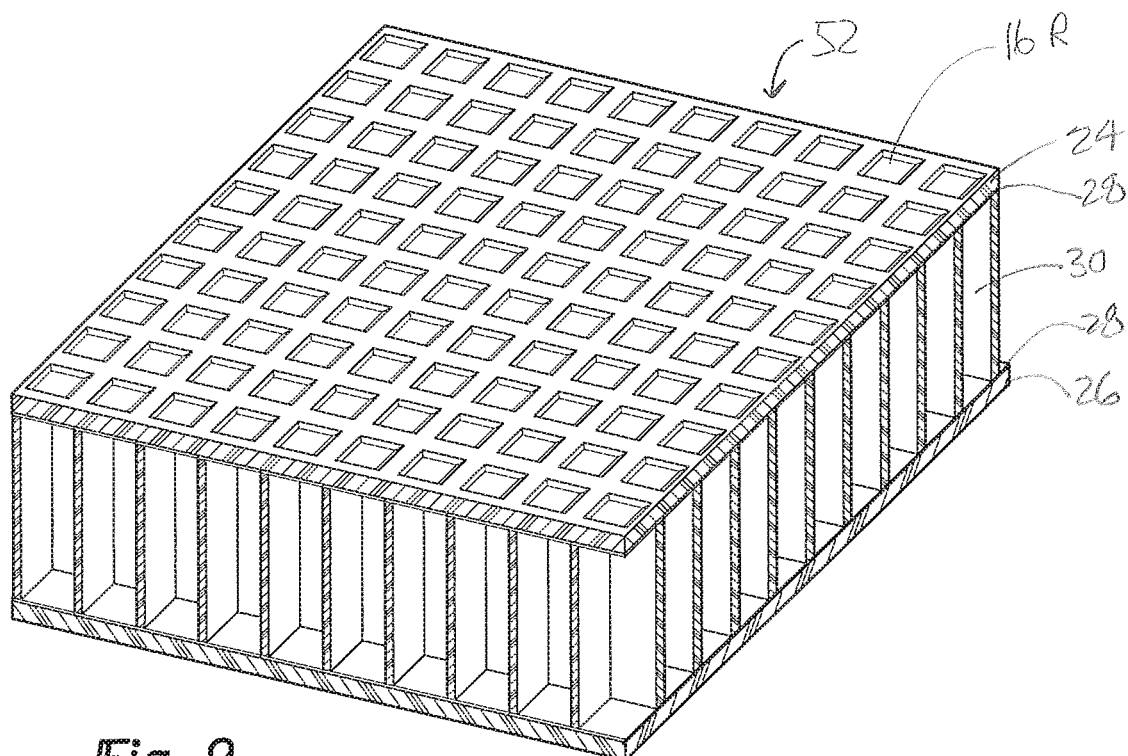
FIG. 9 is a top perspective view, in cross section, of the composite component of FIG. 6, with debossments, by application of fluid pressure.

FIG. 9 shows a composite panel 52 with the debossments 16R formed in rectangular shapes. The cells in the core 30 are similarly rectangular in cross-section. The outer surface of the first skin 24 has enhanced surface traction. The outer surface of the second skin 26 may be naturally debossed, but it will not be visible as part of a marine deck member.

FIG. 8 is an exploded side view of the constituent parts of an alternative embodiment of a composite panel 40 preparatory to compression molding. In this embodiment, thermoplastic skins 34 and 36 are bonded to a thermoplastic core 38 in sealed relation by heating to the softening point of the plastic. The stack may be preheated, or heated in the mold.

The core may be injection molded by the process disclosed in U.S. Pat. No. 7,919,031, titled "Method And System For Making Plastic Cellular Parts And Thermoplastic Composite Articles Utilizing Same," commonly assigned to the assignee of the present invention.

Figure 7:
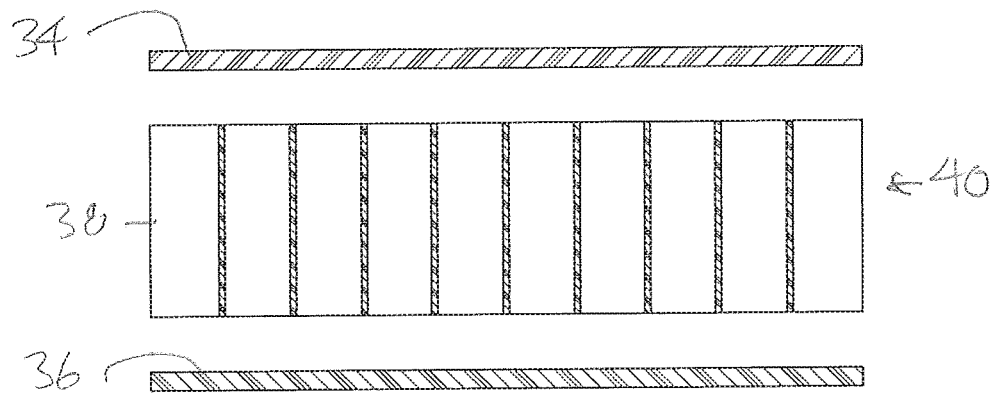
FIG. 7 is an exploded, side sectional view showing a sandwich-type composite panel with first skin of thermoplastic material, a second skin of thermoplastic material, and a cellular core of thermoplastic material positioned between the skins.
Figure 10:
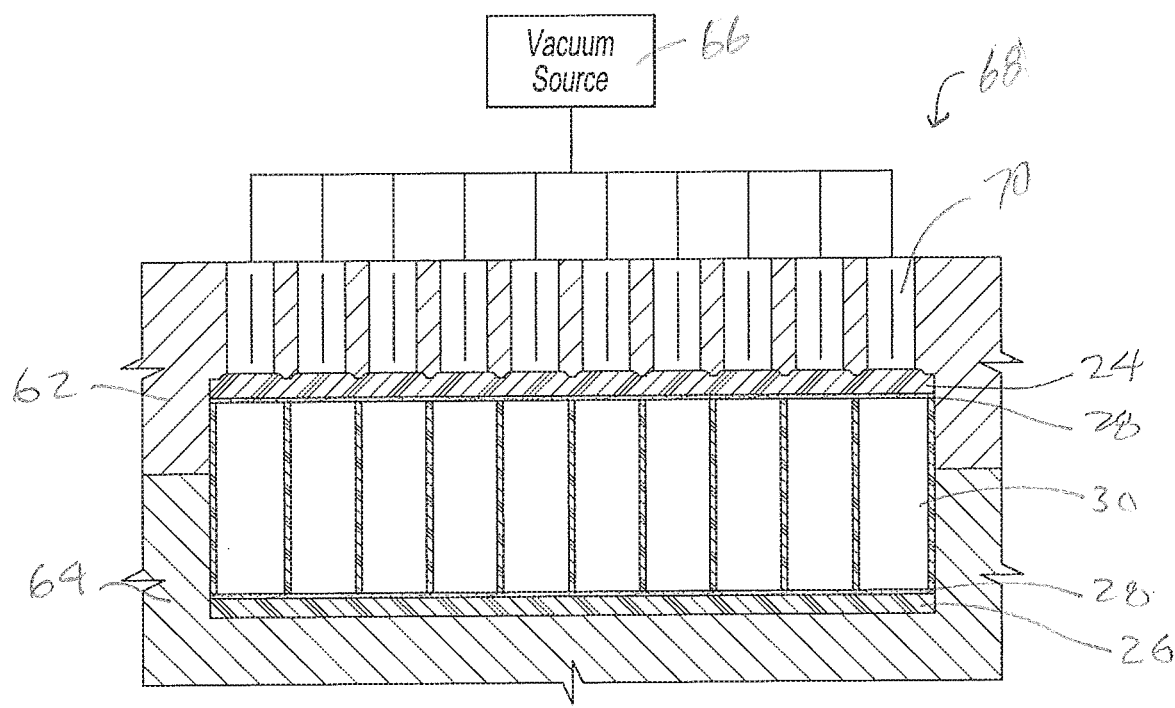
FIG. 10 is a schematic, side sectional view showing a vacuum pressure-assisted compression mold useful in facilitating embossing of the of the upper surface of the molded composite component to enhance its surface traction.
Figure 11:
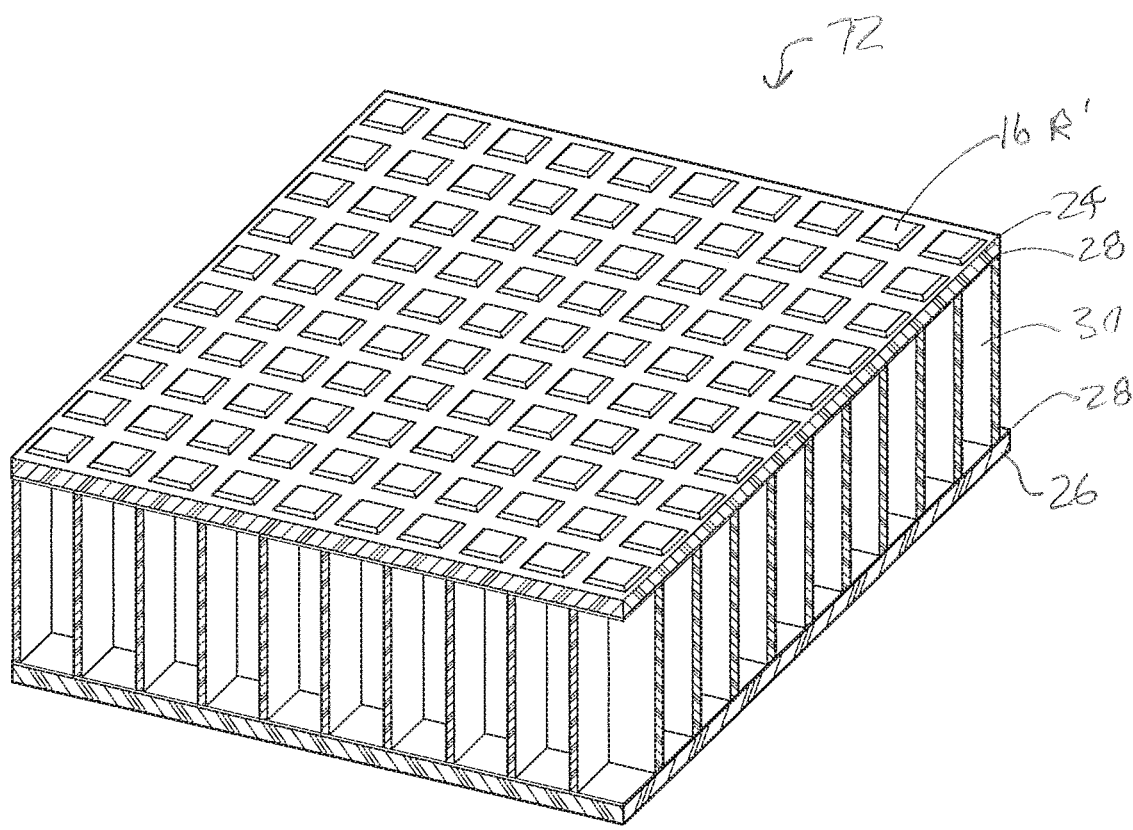
FIG. 11 is a top perspective view, in cross section, of the composite component of FIG. 6, with embossments, by application of vacuum pressure.

A stack whether in the embodiment of stack 32 in FIG. 6, or the stack 40 of FIG. 7, may be formed with either debossments, per the mold configuration of FIG. 8, or formed with embossments, per the mold configuration of FIG. 10.

In FIG. 10, the mold 68 includes mold halves 62 and 64 (corresponding to mold halves 44 and 46 in FIG. 8) and is equipped with a vacuum source 66 to apply vacuum pressure through channels 70 to the outer surface of the plastic skin 24 while the skin is heated and formable in the mold.

The application of sufficient vacuum pressure causes the outer surface of the skin 24 to the raised with embossments 16R on the composite panel. In this case the embossments 16R are rectangular in shape to correspond with the cross-sectional shape of the cells in the core 30. The outer surface of the skin 24 has enhanced surface traction due to the embossments.

FIG. 12 shows the mounting of a fastener component 80 in the composite panel 32. The fastener component 80 includes two parts, a fastener 80A and a sleeve 80B. The fastener component 80 can be used to secure cleats 14 to a marine deck formed of the inventive composite panel.

After compression or press molding, at least one hole 81 is formed in the composite panel 52 such as by cutting through the first skin 24, through the core 30 right up to but not through the second skin 26. A rivet-like fastener sleeve 80B is positioned in the hole 81. Each fastener component 80 is generally of the type shown in U.S. patent publications 7,713,011 and 2007/0258786 (Published patent application US 2007/0258786 in FIGS. 15 and 16 show a tubular body 21 that receives a fastener including a head portion 44 and a shank 45.) wherein the preferred fastener component is called an M4 insert, installed by use of a hydro-pneumatic tool both of which are available from Sherex Fastening Solutions LLC of New York. During installation, an outer sleeve 80B of the fastener component 80 is deformed, as shown in FIG. 12.

The fastener sleeve 80B typically has a relatively large annular flange, generally included at 82, with a plurality of integrally formed locking formations or wedges 84 circumferentially spaced about a central axis of the fastener sleeve 80B below the flange 82 to prevent rotary motion of the fastener component 80 relative to the first skin 24 after installation. The wedges 84 grip into the outer surface of the first skin 24 after the fastener component 80 is attached to the first skin 24.

A fastener 80 of the type illustrated in FIG. 12 can withstand (i) large pull-out forces, (ii) large push-in forces, and large rotational forces (torque). These performance criteria must be met while preserving the mechanical and aesthetic properties of the composite panel 52. Additionally, in this use environment, the underside of the composite panel 32 must remain impervious to moisture absorption. Moisture absorption may result in increased weight and performance degradation over a prolonged period, especially on the underside of a marine deck.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A marine deck comprising:
   a first reinforced plastic skin having an outer surface, the first reinforced plastic skin defining a first opening;

a second plastic skin;

a plastic core connected to the first reinforced plastic skin and the second plastic skin, the core having a plurality of contiguous hollow cells with each cell extending from the first reinforced plastic skin to the second plastic skin, the hollow cells having a cross-sectional cleated shape disposed about axes oriented perpendicular to the skins, wherein the first reinforced plastic skin and the second plastic skin are respectively bonded onto a top surface and a bottom surface of the core and seal the cells with the first reinforced plastic skin, the second plastic skin, and the core forming a unitary structure and with the outer surface of the first reinforced plastic skin including cleat-shaped embossments or debossments which match the cross-sectional cleated shape of the cells;

wherein the first opening extends completely through the first reinforced plastic skin and at least partially extends through the core but not through the second plastic skin, wherein the first opening terminates so as to leave the second plastic skin impervious at the first opening;

a sleeve disposed in the first opening defined by the first reinforced plastic skin, wherein the sleeve defines a second opening, the sleeve having an annular flange engaging the outer surface of the first reinforced plastic skin, the sleeve having a plurality of locking wedges that engage an inner surface of the first reinforced plastic skin opposite the outer surface thereof, the annular flange and the locking wedges prevent the sleeve from moving relative to the first reinforced plastic skin;

a fastener received in the second opening defined by the sleeve; and a cleat secured by the fastener to the unitary structure.

\* \* \* \* \*